Sept. 3, 1963
E. L. VALENTINE
3,102,341
MILK HOLDING TANK
Filed Oct. 13, 1961
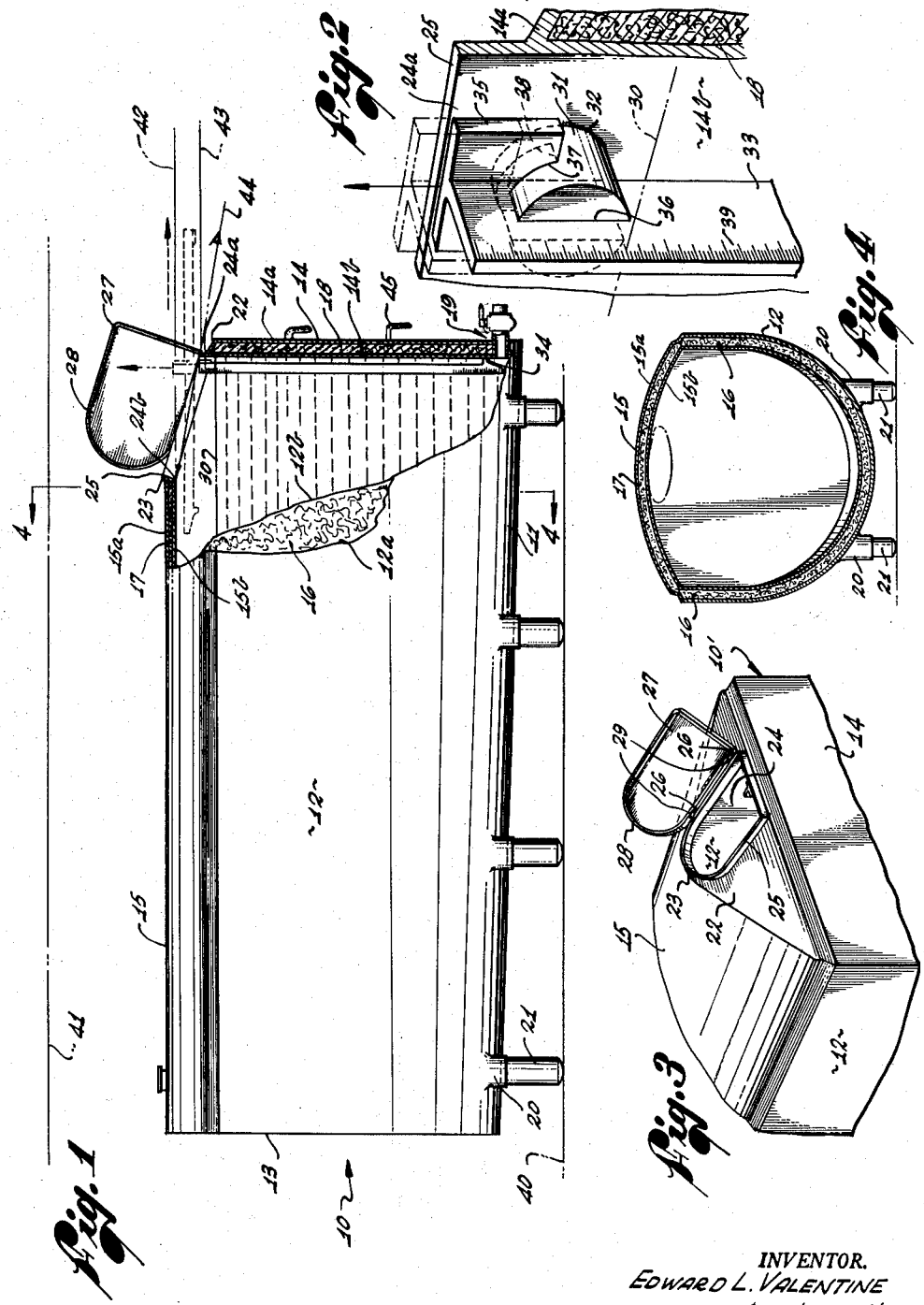
INVENTOR.
EDWARD L. VALENTINE
BY
ATTORNEYS

# United States Patent Office 3,102,341
Patented Sept. 3, 1963

3,102,341
MILK HOLDING TANK
Edward L. Valentine, 3470 Randolph St.,
Huntington Park, Calif.
Filed Oct. 13, 1961, Ser. No. 144,972
2 Claims. (Cl. 33—126.7)

The present invention relates generally to storage tanks and more particularly to a tank for temporarily holding a quantity of raw fluid milk at a dairy farm in the interim between collection of the milk from the cows and the time at which the milk is picked up in a tank truck or the like for delivery to a dairy for processing.

Milk holding tanks are subject to very strict official supervision as to construction and use. Due to the easily contaminated nature of the raw milk, the tank is subject to a continuous program of visual inspection for cleanliness. In order to preserve the milk at a temperature to inhibit bacterial action, such tanks are cooled and so have insulation, not only in the floor and side walls, but also in a top wall, formed integrally with the side walls, whereby it becomes impracticable to provide large access doors in the top of a tank. Accordingly, it is customary to provide only relatively small manhole access openings in the tank top. Heretofore, it has not been possible to see all portions of a tank interior merely by viewing through the manhole opening and, therefore, it has been frequently necessary for inspectors to enter through the manhole opening in order to complete the inspection. However, with my invention all portions of the tank interior can now be visually inspected merely by peering in through the access opening.

Milk holding tanks are also subject to strict control and supervision by official sealers of weights and measures, or the like, so as to insure an accurate measurement of the volume or weight of milk withdrawn from the tank, as this is the basis for the computation of the amount due to the seller and to be paid by the purchaser. Keeping in mind the sanitation requirements, experience has shown that a dip stick type of measuring device is the most practical, even though it may not be the most accurate. Accordingly dip sticks are most commonly used but in order to insure that the amount paid for the milk corresponds to the actual volume or weight of milk taken from the tank, it is essential that the dip stick measurement be made as accurate as is possible. The reason for this will become apparent when it is taken into account that milk holding tanks have a large horizontal area so that an error of as little as 1/32 of an inch in the dip stick measurement can be equivalent to an error of several gallons or pounds of milk per day. The same error, consistently made, can mean a significant loss to either the buyer or seller over a period of as little as one week.

Commonly, milk holding tanks are of horizontally extending cylindrical configuration, or approximately so. Larger sizes of such tanks, as for example in the range around 3000 gallons, may stand as much as eight feet high and require dip sticks of as much as six feet in length. Obviously, this dip stick is far too long to be inserted through the usual size of manhole access opening of about 18 inches in diameter, in any position except coaxially with the opening. Accordingly, in order to provide suitable clearance space above the tank for the manipulation of the dip stick, the room in which the tank is housed must have a ceiling about twice the height of the tank or, at the very least, have a skylight opening or ceiling vent positioned above the access opening in the tank. Every tank must have at least one full length dip stick, i.e., a stick substantially as long as the inside height of the tank, which is officially certified by an official sealer. Sometimes, additional partial or relatively short dip sticks may be used and such partial sticks must also be officially certified by the sealer but, even when so certified, are not as accurate as the full length stick, for reasons which will be apparent hereafter. In any event, with both full length and partial sticks it has heretofore been necessary to provide a clearance space above the tank which is substantially as high again as the height of the tank.

Among the major objects of my invention are the elimination of the several disadvantages of the previously available tanks mentioned above.

More specifically, and in addition, my invention has for an object the provision of a milk holding tank that is permanently, almost entirely closed except for a relatively small manhole access opening in one end of the tank, through which opening all of the interior surface of the tank is subject to ready visual inspection for cleanliness.

Yet another object of the invention is to provide a tank of this class having an improved dip stick measuring device that will more accurately reflect the volume of milk to be withdrawn from the tank.

Yet another object of the invention is to provide an improved milk holding tank that enables the dip stick to be inserted into and withdrawn from the tank while the dip stick is substantially horizontally disposed and with a minimum of hand-over-hand handling of the dip stick whereby the clearance over a tank may be held to a minor proportion of the height of the tank so that there is no longer any need to provide high ceilings, skylights or vents over the access manhole.

These and other objects and advantages of my invention will be apparent from the following description of a presently preferred embodiment when taken in conjunction with the annexed drawings.

FIGURE 1 is a side elevational view, partly in section, of a milk holding tank incorporating my invention.

FIGURE 2 is a fragmentary perspective view of the dip stick support and guide means.

FIGURE 3 is a partial perspective view of the forward end of the tank.

FIGURE 4 is a vertical sectional view taken on the line 4—4 of FIGURE 1.

The drawing shows a relatively large milk holding tank 10, for example, a tank of about 3000 gallons capacity having a length of about 12 feet, a width of 7 or 8 feet and an overall height of about 7 feet. It will, of course, be appreciated that these dimensions are given only by way of example. Tanks of this type are usually placed in or immediately adjacent to a milking barn and the fresh raw milk is delivered through a piping system (not shown) directly from the cows into the tank. Such tanks incorporate cooling means to keep the milk at a temperature to inhibit bacterial action, around 32 degrees F., or slightly thereabove, and, also, typically incorporate a motor driven agitator to blend into a homogeneous mixture the milk received from the several cows. However, as such cooling means and agitator do not, per se, come within the ambit of the invention, they have not been illustrated.

The tank 10 is of double wall construction throughout, having a bottom 11, a pair of opposite side walls 12, a rear head or end wall 13, a front head or end wall 14, and a top wall 15. Consistent with my invention, tanks may assume one of a variety of suitable cross-sectional configurations, as for example, rectangular or circular, and are commonly made of stainless steel sheet material. In the tank 10, the opposite pair of side walls 12 are formed integrally with the bottom wall 11, these walls being defined by a pair of sheets 12a and 12 bent into substantially semi-cylindroid shape and having a layer of insulating material 16 disposed therebetween. The top wall 15 is also made of two sheets 15a and 15b of downwardly concave configuration and having insulating material 17 therebetween. The end wall 13 is like the front end wall 14, the latter being made up of two flat sheets 14a and 14b between which another blanket of insulating material 18 is disposed. The rear end wall 13 is geometrically similar to and smaller than the front end wall 14 whereby the tank bottom 11 slopes toward the front wall to permit draining of milk from the holding tank through a valve controlled opening 19, provided at the lowermost portion of the front wall. A plurality of sockets 20 spaced longitudinally of the tank 10 on its opposite sides, affixed to the exterior of the tank bottom 11, receive adjustably mounted legs 21 for setting the tank on the floor in a level attitude of the top wall 15 and of an exterior shoulder 22, defined at the junction of the side walls 12 with the top wall 15.

As shown in FIGURE 3, the top wall 15 of the tank 10, at the front end, has an inclined portion 22, preferably defined by integral portions of the sheets 15a and 15b having portions of the insulating material 17 therebetween. The inclined portion 22 is generally triangular in configuration, having its base edge substantially coincident with the upper edge of the front wall 14, the other two legs of the triangle defining an apex as at 23, at about the longitudinal center line of the top wall 15. In the central area of the triangularly shaped inclined portion 22, a manhole opening 24 is provided, being defined by a continuous lip 25 projecting slightly above the plane of the outer skin of the inclined portion 22, but being flush with the inner skin so as to not project inwardly of the tank 10.

On one side of the manhole opening 24, and on the outside of the lip 25, a pair of L-shaped hinge members 26 are provided, the free ends of the members 26 being coaxially disposed and pointing in the same direction, i.e., rearwardly and upwardly of the tank 10. A door 27, of configuration similar to the configuration of the manhole opening 24, is formed with a pheripheral continuous flange 28 adapted to seat around the lip 25 of the manhole opening 24. On one side of the door 27, the continuous flange 28 is provided with a spaced pair of perforated ears 29 adapted to removably receive the hinge members 26, whereby the door may be swung open and closed relative to the manhole opening 24.

While the manhole opening 24 may be of any convenient configuration, it should be disposed in an inclined plane such as that defined by the inclined wall portion 22. Further, the manhole opening 24 should be disposed with its lowermost portion coincident with the inner skin of a side wall of the tank and with its uppermost portion coincident with the uppermost portion of the inner skin of the top wall of the tank. Thus, in the tank 10, a lowermost end 24a of the manhole opening 24 is coincident with the upper edge of the inner skin 14b of the front end wall 14, the corresponding portion of the lip 25 comprising an upward extension of the material of the inner skin 14b. The upper end 24b of the opening 24 is coincident with the apex 23 of the triangularly shaped inclined wall portion 22, at the elevation of the uppermost portion of the inner skin 15b of the top wall 15.

Assuming the tank 10 to be of about 3000 gallon capacity, it is shown in FIGURE 1 as being filled to capacity, i.e., to the level indicated at 30. This level, of course, is beneath the level of the lowermost portion of the manhole opening 24. As is shown in FIGURE 2, a hanger 31 of generally cylindrical configuration is rigidly affixed by welding 32 to the inner skin 14b of the front head 14, above the level 30 and in the lowermost portion 24a of the manhole opening 24. A full length dipstick 33 is provided, of the type shown in my Patent No. 2,695,453, in the present instance being approximately 6 feet long and in the general configuration of a thick blade of stainless steel and provided with a foot 34 adajacent its lower end. At the upper end of the dipstick 33 and on the same edge having the foot 34, a rectangular hanger head 35 is rigidly affixed to the dipstick in a plane normal to the plane of the dipstick blade.

On its free end, the hanger 31 is formed with a vertically disposed and diametrically extending slot 36, the upper end of which merges and communicates with an arcuately extending slot 37 formed in the upper face of the hanger 31. As is shown in FIGURE 2, the vertical slot 36 is adapted to slidably receive the blade of the dipstick 33 while the upwardly opening slot 37 slidably receives the hanger head 35 of the dipstick 33. The slot 36 is related at right angles to the slot 37, i.e., in the same relationship as the plane of the hanger head 35 to the blade of the dipstick 33 so that when the head 35 is slidably engaged in the slot 37 the dip stick 33 is constrained to perfectly vertical and plumb movement. The slot 37 is spaced from the inner skin 14b a distance in accord with the length of the foot 34, so that the dipstick 33, when seated, is disposed in perfectly plumb position. The slot 37 has a bottom 38 which, when engaged by the bottom edge of the hanger head 35, defines an index position for the dipstick 33. When the dipstick 33 is in indexed, plumb position, markings 39 on the blade of the dipstick 33, graduated in 32nds of an inch, are disposed in a perfectly level attitude.

Referring to FIGURE 1, the tank 10 is illustrated as resting on a floor 40 within a room having a ceiling 41. As the tank 10 is assumed to be of about 3000 gallon capacity and standing about 7 feet high to the level of the top wall 15, the ceiling 41 may be assumed to be about 9 or 10 feet high. However, despite the relatively low ceiling 41 and without providing any vent or other clearance above the door 27, practically all of the interior of the tank 10 is visually accessible for inspection, can be entered if necessary through the manhole 24, and the dipstick 33 can be inserted and withdrawn with a minimum of handling to obtain accurate measurements, even though the clearance space between the top of the tank and the ceiling 41 is relatively small and is far less than the length of the dipstick.

The level of the highest portion of the inner skin 15b of the top wall 15 is indicated in FIGURE 1 by the line 42 and includes the uppermost portion 24b of the manhole opening 24. Similarly, the line 43 in FIGURE 1 indicates the upper edge of the lip 25 in the lowermost portion 24a of the manhole opening. Preferably, the normal spacing between the lines 42 and 43 is at least as great as the overall width of the dipstick 33, i.e., the width at the foot 34, in order to facilitate passage of the dipstick 33 through the opening 24 while the dipstick is maintained in a horizontal position. However, the spacing need not be this great for the purpose of passing the dipstick in and out of the tank through the opening 24, but this minimum spacing is preferred in order to give an upward line of sight such as indicated at 44, i.e., the line of sight defined by the upper edge of the lip 25 in the lowermost portion 24a of the manhole opening and the lower edge of the uppermost portion 24b of the manhole opening. Thus, when a person is supported by rungs 45 affixed to the exterior of the front end wall 14, all of the inner skin 15b of the top wall 15 of the tank 10 is visible. After a visual inspection of the skin 15b is complete, all of the inner skin 12b of the opposite side walls and floor 11, and the end wall 13, can be seen by looking in directly through the manhole opening 24 and this is indicated in FIGURE 4. The inner skin 14b of the front end wall 14 is, of course, very readily seen, and the head of the inspector need only be inserted in the tank in order to look at the inner skin of the inclined wall portion 22. As this is immediately adjacent the opening, it is very readily accessible.

The dipstick 33 is customarily kept out of the tank 10 and is inserted only for the period of time required to make a measurement. The dipstick is customarily kept in its own sanitary enclosure and after removal therefrom need only be touched at the head, which does not enter the milk, and at some lower point therealong, which does enter the milk. It is usual to use sanitary cloths in handling the dipstick 33.

To insert the dipstick, a lower end part is swung upwardly to rest on the lower portion of the continuous flange 25, after which the dipstick can be pushed inwardly to slide across the flange in a horizontal attitude. As more and more of the dipstick enters the tank and as its center of gravity passes over the lip 25, the inner end may be allowed to swing downwardly while being pushed inwardly. When the dipstick reaches a vertical position, only a very short section will protrude upwardly above the level of the upper wall 15 of the tank 10.

If agitation of the milk has occurred due to the entrance of the dipstick, the lower edge of the hanger head 35 can be supported on top of the hanger 31, without entering the arcuate slot 37, until the milk level has become perfectly stable. Thereafter, the blade of the dipstick 33 being engaged in the slot 36, the dipstick can be moved to align the hanger head 35 with the slot 37. The dipstick can then be lowered, under the guidance of both the slots 36 and 37, until the dipstick is indexed at 38. It will be seen that throughout the terminal lowering movement of the dipstick 33, i.e. the height of the slot 37, the markings 39 of the dipstick blade are maintained in a perfectly horizontal attitude and the lowering occurs without disturbing the milk level line 30 because the dipstick is steadied by the slots 36 and 37 as well as by the foot 34.

When a tank is full of milk, or substantially so, the hydrostatic pressure of the milk causes deformation of the side and end walls. Such deformation is greatest about half way up the walls and is sufficient to induce inaccuracies in the use of half length or similar short dipsticks. As the extent and nature of deformation cannot be predicted so that an appropriate length of a foot for the stick cannot be determined, the graduated markings are thrown slightly out of horizontal attitudes, or at least sufficiently out of the horizontal to make it impossible to accurately determine which of adjacent $\frac{1}{32}$ inch markings has been wetted by the milk level line. Where overhead clearance is at a minimum, the use of short dipsticks is more convenient, but because of this inherent inaccuracy proves somewhat expensive since an error of $\frac{1}{32}$ of an inch, accumulated over a short period, may add up to more than the cost of raising the ceiling or providing a skylight. As my dipstick 33 is supported in perfectly plumb and indexed position by means of the slots 36 and 37 and by the foot 34 engaged with a portion of the tank wall where an insignificant amount of wall deformation occurs, a full length dipstick with its greater accuracy can be conveniently employed and without the expense of renovating the ceiling of the room of which the tank is housed.

While the features of my invention have been set forth in detail with respect to only one embodiment of the invention, this is to be taken as a preferred example. It will, of course, be understood that other modifications may be made within the spirit and scope of this invention. I do not, therefore, wish to be limited to the exact details hereinabove set forth but only as required by the following claims.

I claim:

1. In a milk holding tank, a horizontally extending top wall having an opening formed in an inclined portion at one end of said top wall, said opening having an outward edge portion contiguous to the upper edge of a vertically extending end wall of said tank and disposed in a horizontal stratum lower than a horizontal stratum including the opposite inward edge portion of said opening, said top wall extending longitudinally inwardly beyond said inward edge of said opening in substantially the same horizontal stratum as said inward edge, an elongated rigid measuring device to indicate the level of milk in said tank when said device is held in a vertically extending, indexed, plumb position in said tank, said device having graduations marked thereon and arranged to extend horizontally when said device is plumb, a head affixed to the upper end of said device, and a support member interiorly affixed on said end wall adjacent the upper edge of said end wall to seat said head of said device, said head and support member having cooperating means to seat said head in an indexed position of said device, said means also being adapted to guide said device during vertical movement of said device to constrain said graduations to horizontal attitudes whereby to parallel the level of milk in said tank, said cooperating means comprising a vertically extending slot formed in said support member that opens inwardly of said tank and intersecting an upwardly opening slot also formed in said support member in a plane perpendicular to the plane of said inwardly opening slot, said measuring device being vertically slidable in said inwardly opening slot and said head being slidably receivable within said upwardly opening slot. said device, when free of said support member and with the major portion of its length within said tank, being swingable between horizontal and vertical positions in the space between said end wall and said top wall while said head is held within said opening, said device being horizontally movable through said opening in a direction longitudinally of said device.

2. In a milk holding tank, a horizontally extending top wall formed with an inclined opening at one end, said opening having an edge portion contiguous to a vertically extending end wall of said tank, an elongated rigid measuring device to indicate the level of liquid in said tank when said device is held in a vertically extending plumb, indexed position in said tank, said device having graduations marked thereon and arranged to extend horizontally when said device is in said plumb, indexed position, a head affixed to the upper end of said device and a support member interiorly affixed on said end wall adjacent the upper edge of said end wall to seat said head of said device, said head and support member having cooperating means to seat said head in an indexed position of said device, said means also being adapted to guide said device during terminal downward movement of said device to constrain said graduations to horizontal attitudes whereby to parallel the level of liquid in said tank, said cooperating means comprising a vertically extending slot formed in said support member that opens inwardly of said tank and that intersects an upwardly opening slot also formed in said support member in a plane angularly related to the plane of said inwardly opening slot, said measuring device being vertically slidable in said inwardly opening slot and said head being slidably receivable within said upwardly opening slot.

References Cited in the file of this patent

UNITED STATES PATENTS

| | | |
|---|---|---|
| 994,921 | Harry | June 13, 1911 |
| 2,273,601 | Thomas | Feb. 17, 1942 |
| 2,336,443 | West | Dec. 7, 1943 |
| 2,657,819 | Blackburn | Nov. 3, 1953 |
| 2,695,453 | Valentine | Nov. 30, 1954 |